(12) United States Patent
Sijstermans et al.

(10) Patent No.: US 9,823,869 B2
(45) Date of Patent: Nov. 21, 2017

(54) SYSTEM AND METHOD OF PROTECTING DATA IN DYNAMICALLY-ALLOCATED REGIONS OF MEMORY

(71) Applicant: NVIDIA Corporation, Santa Clara, CA (US)

(72) Inventors: Franciscus Sijstermans, Los Altos Hills, CA (US); Steven Molnar, Chapel Hill, NC (US); Gilberto Contreras, San Jose, CA (US); Jay Huang, Sunnyvale, CA (US); Jay Gupta, Milpitas, CA (US); Michael Wasserman, Redwood City, CA (US); James Deming, Madison, AL (US)

(73) Assignee: Nvidia Corporation, Santa Clara, CA (US)

( * ) Notice: Subject to any disclaimer, the term of this patent is extended or adjusted under 35 U.S.C. 154(b) by 74 days.

(21) Appl. No.: 14/544,468

(22) Filed: Jan. 8, 2015

(65) Prior Publication Data

US 2015/0301761 A1   Oct. 22, 2015

Related U.S. Application Data

(60) Provisional application No. 61/925,124, filed on Jan. 8, 2014.

(51) Int. Cl.
| | |
|---|---|
| *G06F 12/14* | (2006.01) |
| *G06F 3/06* | (2006.01) |
| *G06F 12/109* | (2016.01) |
| *G06F 21/60* | (2013.01) |

(52) U.S. Cl.
CPC .......... *G06F 3/0623* (2013.01); *G06F 3/0644* (2013.01); *G06F 3/0659* (2013.01); *G06F 3/0673* (2013.01); *G06F 12/109* (2013.01); *G06F 12/1408* (2013.01); *G06F 12/1441* (2013.01); *G06F 12/1458* (2013.01);
(Continued)

(58) Field of Classification Search
None
See application file for complete search history.

(56) References Cited

U.S. PATENT DOCUMENTS

4,805,097 A  *  2/1989  De Sanna ............... G06F 12/10
                                                              711/206
4,991,082 A  *  2/1991  Yoshizawa ............ G06F 12/109
                                                              711/206
(Continued)

*Primary Examiner* — Kaushikkumar Patel (57) ABSTRACT

Embodiments of the claimed subject matter provide systems and methods for protecting data in dynamically allocated regions of memory. The method can include receiving the read request where the read request comprises a virtual address associated with a memory and determining a physical address associated with the virtual address. The further includes determining whether the physical address associated with the virtual address is read protected and determining whether the read request is from a component allowed to access read protected memory. The read protected memory was dynamically allocated on a per page basis. The method further includes in response to determining that the read request is to a read protected physical address and determining that the component is allowed to access read protected memory, sending the data from the physical address in the memory.

19 Claims, 8 Drawing Sheets

(52) U.S. Cl.
CPC ...... *G06F 21/60* (2013.01); *G06F 2212/1052* (2013.01); *G06F 2212/152* (2013.01)

(56) References Cited

U.S. PATENT DOCUMENTS

| | | | | |
|---|---|---|---|---|
| 5,604,864 | A * | 2/1997 | Noda | G06F 12/145 711/100 |
| 5,628,023 | A * | 5/1997 | Bryant | G06F 12/145 711/207 |
| 5,890,189 | A * | 3/1999 | Nozue | G06F 12/109 711/100 |
| 6,044,445 | A * | 3/2000 | Tsuda | G06F 12/1081 711/152 |
| 7,631,160 | B2 * | 12/2009 | Strongin | G06F 21/79 711/163 |
| 8,006,055 | B2 * | 8/2011 | Waters | G06F 12/1491 711/156 |
| 8,954,695 | B1 * | 2/2015 | Thathapudi | G06F 12/145 711/163 |
| 2001/0007112 | A1 * | 7/2001 | Porterfield | G06F 12/1081 718/104 |
| 2005/0022192 | A1 * | 1/2005 | Kim | G06F 12/1036 718/100 |
| 2005/0097294 | A1 * | 5/2005 | Hepkin | G06F 9/4812 711/170 |
| 2007/0050580 | A1 * | 3/2007 | Lewis | G06F 12/1483 711/163 |
| 2007/0055837 | A1 * | 3/2007 | Rajagopal | G06F 12/1475 711/163 |
| 2009/0204784 | A1 * | 8/2009 | Favergeon-Borgialli | G06F 12/0207 711/203 |
| 2009/0316889 | A1 * | 12/2009 | MacDonald | G06F 21/10 380/201 |
| 2010/0174860 | A1 * | 7/2010 | Kim | G06F 12/0246 711/112 |
| 2011/0307677 | A1 * | 12/2011 | David | G06F 9/5016 711/163 |
| 2014/0006737 | A1 * | 1/2014 | Teh | G06F 12/1475 711/163 |
| 2015/0018089 | A1 * | 1/2015 | Caldas | G07F 17/3241 463/29 |
| 2015/0052325 | A1 * | 2/2015 | Persson | G06F 12/1433 711/163 |

* cited by examiner

SYSTEM AND METHOD OF PROTECTING DATA IN DYNAMICALLY-ALLOCATED REGIONS OF MEMORY

RELATED U.S. APPLICATIONS

This application claims the benefit of and priority to the provisional patent application Ser. No. 61/925,124, entitled "SYSTEM AND METHOD FOR PROTECTING DATA IN DYNAMICALLY-ALLOCATED REGIONS OF MEMORY," with filing date Jan. 8, 2014, which is hereby incorporated by reference in its entirety.

FIELD OF THE INVENTION

Embodiments of the present invention are generally related to memory access techniques and to protecting content.

BACKGROUND

As technology has advanced, computers have increasingly been used for more and more tasks including content output and display. While computers enable rendering of higher resolution and higher definition content, computers have in some cases been used to make unauthorized copies of digital content. Unauthorized copied content may then be distributed through the Internet thereby depriving the content creators and distributors of valuable business and revenue.

In the past, the sheer large size of raw uncompressed content was itself an obstacle to easy copying and transferring of unauthorized content. With recent increases in the availability of both hardware and software compression technologies, increases in memory, and increases in bandwidth, transferring unauthorized copies of digital content has become much easier and more prevalent.

One conventional solution has been to allocate a large chunk of memory for content storage and to protect that large chunk of memory. However, modern operating systems generally partition memory into small segments, such as pages, resulting in this large chunk of memory (allocated for content) being placed outside the management of the operating system. This results in a large portion of the memory being unavailable for use by the operating system thereby negatively impacting system performance. Another solution has been to specify (at boot time) a size of a protected region for the digital content that remains fixed during the power on state of the device. The size of the region is conservatively estimated to cover the worst case scenario of the size needed for storing and displaying the content. Both solutions result in large chunks of memory not being usable for long periods. The memory is not available for use even when the content is not being rendered. These approaches also reduce the size of the memory being managed by the operating system and thereby increase memory pressure of other unrelated processes.

Another solution has been to specify the size of the protected region at boot time and adjust the size of the protected region by increasing or decreasing it as needed based on the size of the content. However, given the dynamic nature of memory allocation and memory fragmentation resulting from memory allocation operations, it is difficult for the operating system to allocate a contiguous region of memory for the content. Better approaches are needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A need has arisen for a solution that protects data in a way that is compatible and transparent to the operating system without the need to reserve large regions of memory. Accordingly, embodiments protect access to read protected, write protected, and read-and-write protected regions of memory from unauthorized access. Secure processing of content is facilitated by controlling the read and write requests to protected regions of memory. The protected regions of memory can be dynamically allocated and virtualized to allow the data to be stored in one or more noncontiguous portions of the memory. This thereby allows an operating system to remain in management control of memory without a large contiguous allocation for content. Content protection and security at a small granularity is further provided. For example, protected regions of memory can be accessed based on the memory page size, e.g., 4 KB. The protection mechanism described herein can thereby be used with existing systems without modification.

One embodiment of the present invention is directed to a method for processing a read request. The method includes receiving the read request where the read request comprises a virtual address associated with a memory and determining a physical address associated with the virtual address. The read request can further include an indicator indicating that the component will protect the data associated with the virtual address. The further includes determining whether the physical address associated with the virtual address is read protected and determining whether the read request is from a component allowed to access read protected memory. The read protected memory was dynamically allocated on a per page basis. The method further includes in response to determining that the read request is to a read protected physical address and determining that the component is allowed to access read protected memory, sending the data from the physical address in the memory.

The protected memory can include a plurality of dynamically allocated noncontiguous memory locations. The data stored at the physical address can include protected digital content. In some embodiments, a data store includes protection information associated with locations in the protected memory and the data store is maintained by secure software. In some embodiments, a data store includes protection information associated with locations in the protected memory and the data store is automatically updated by a hardware component upon a write to the read protected memory. In some embodiments, a data store includes protection information associated with locations in the protected memory, wherein the data store is created by unsecure software, and upon deallocation of a location with the protected memory, the data at the location is overwritten.

Another embodiment of the present invention is directed to a method of processing a write request. The method includes receiving the write request, where the write request comprises a virtual address associated with a memory, data, and an indicator that the data is to be written to a protected region within the memory, and determining a physical address associated with the virtual address. The write request can be received at a memory management unit (MMU).

The method further includes determining whether the physical address associated with the virtual address is in protected memory, where the protected memory was dynamically allocated on a per page basis and determining whether the write request is from a component allowed to access protected memory. The method further includes in response to determining that the write request is to a protected physical address and determining that the component is allowed to access protected memory, writing the data to the physical address in the memory.

Embodiments of the method can further include in response to determining that the indicator indicates that data is to be written to a protected region in the memory and that the physical address associated with virtual address in the memory is not protected, sending an error signal. The data stored at the physical address in the memory can include write protected executable code. In some embodiments, a data store includes protection information associated with locations in the read protected memory and the data store is maintained by secure software. In some embodiments, a data store includes protection information associated with locations in the read protected memory and the data store is automatically updated by hardware component upon a write to the read protected memory. In some embodiments, a data store includes protection information associated with locations in the protected memory, wherein the data store is created by unsecure software, and upon deallocation of a location with the protected memory, the data at location is overwritten.

Another embodiment of the present invention is directed to a device. The device includes a memory and a data store comprising information associated with memory locations in a protected region of the memory and information associated with access to the protected region of memory by one or more components. The device further includes a processor comprising one or more processing elements and a memory management unit (MMU) for processing read and write request to the memory from the processor. The MMU is configured to limit read access of the one or more processing elements to a protected portion of the memory. The protected region comprises dynamically allocated portions of the memory.

The MMU can further be configured to limit write access to the one or more processing elements to a protected portion of the protected region of the memory. The write protected portion can include executable code associated with a processing element of the one or more processing elements. In some embodiments, the data store is maintained by secure software. In some embodiments, the data store is automatically updated by the MMU upon a write to the read protected memory. In some embodiments, the data store is created by unsecure software, and upon deallocation of a location with the read protected memory, the data at location is overwritten by the MMU.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Reference will now be made in detail to the preferred embodiments of the claimed subject matter, a system and method of protecting data in dynamically-allocated regions of memory, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "generating," "protecting," "receiving," "sending," "determining," "selecting," "initiating," "mapping," "translating," "accessing," "writing," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

System and Method of Protecting Data in Dynamically-Allocated Regions of Memory

Embodiments of the present invention protect access to read protected, write protected, and read-and-write protected regions of memory from unauthorized access. Secure processing of content is facilitated by controlling the read and write requests to protected regions of memory. The protected regions of memory can be dynamically allocated and virtualized to allow the data to be stored in one or more noncontiguous portions of the memory. This thereby allows an operating system to remain in management control of memory without a large contiguous allocation for content. Content protection and security at a small granularity is further provided. For example, protected regions of memory can be accessed based on the memory page size, e.g., 4 KB.

Figure 1:
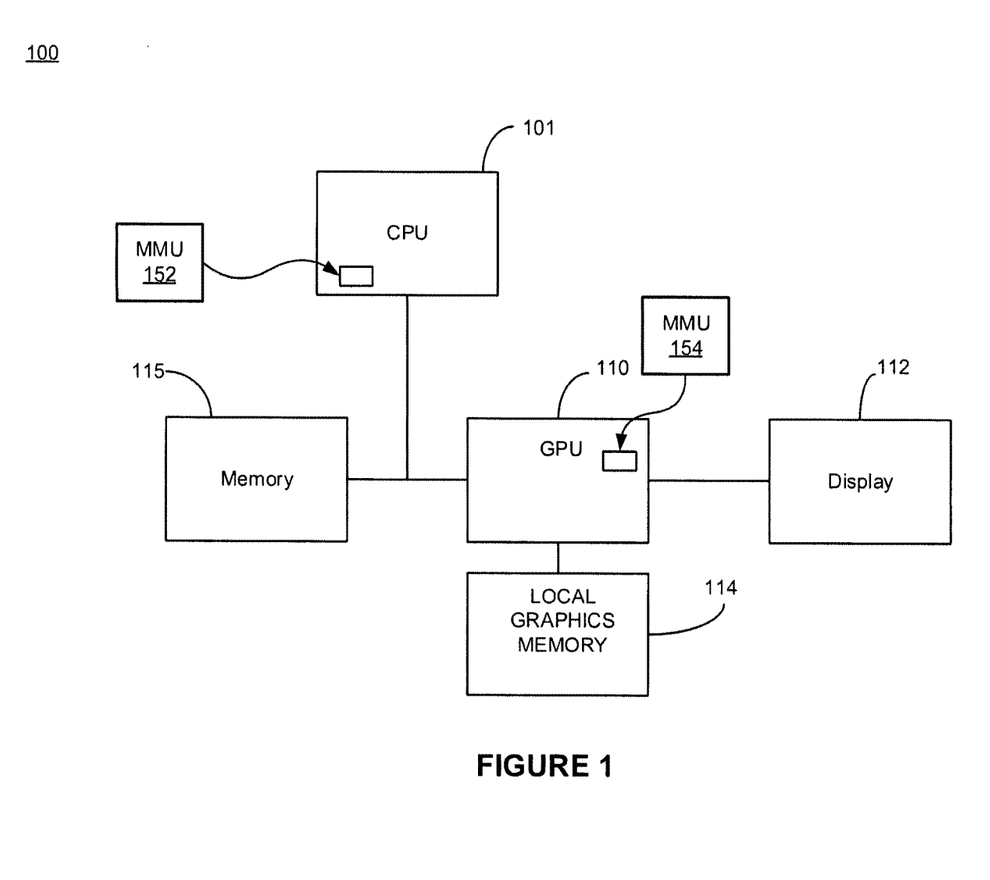
FIG. 1 shows a computer system in accordance with various embodiments.
Figure 2:
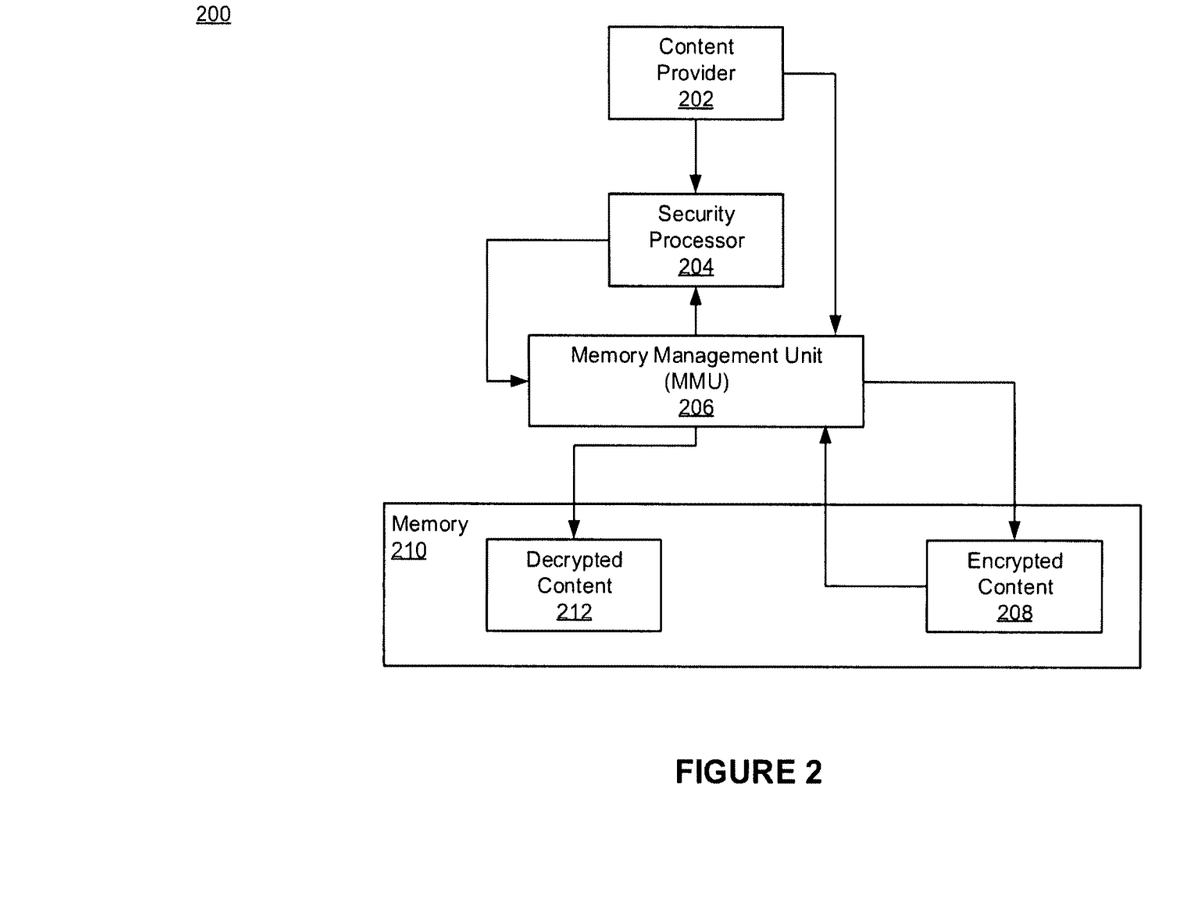
FIG. 2 shows exemplary components involved in decrypting data and storing the data in a protected manner, in accordance with various embodiments.
Figure 8:
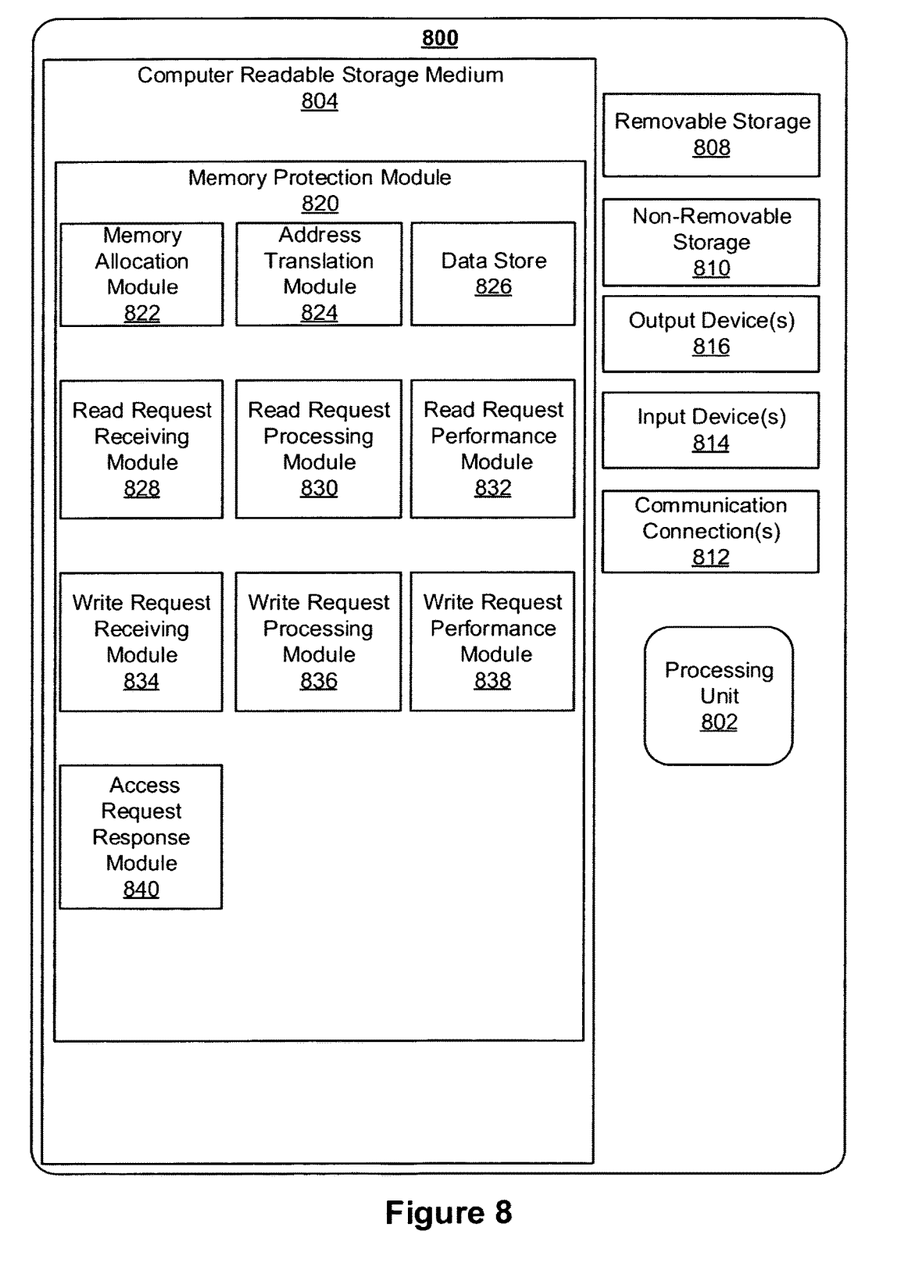
FIG. 8 shows a block diagram of an exemplary computer system platform and associated modules in accordance with various embodiments.

FIGS. 1-2 and 8 illustrate example components used by various embodiments of the present invention. Although specific components are disclosed in FIGS. 1-2 and 8, it should be appreciated that such components are exemplary. That is, embodiments are well suited to having various other components or variations of the components recited in 1-2 and 8. It is appreciated that the components in FIGS. 1-2 and 8 may operate with other components than those presented, and that not all of the components of FIGS. 1-2 and 8 are required to practice embodiments of the present invention as described herein.

Embodiments are described with respect to digital content including video but may be used with any type of content or data type. Embodiments are described with respect to a memory management unit and associated GPU but can be used with any type of processor including a CPU, SoC, integrated CPU/GPU processors, ARM processors, etc. While single instances of a memory management unit are discussed herein, it is appreciated that one or more memory management units may be interchanged in place of the MMU discussed herein.

FIG. 1 shows an exemplary computer system 100 in accordance with one embodiment of the present invention. Computer system 100 depicts the components of a generic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 may be coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

In some embodiments, the CPU 101 includes a memory management unit (MMU) 152 which dynamically allocates memory for one or more protected regions in the system memory 115 and manages requests to protected and unprotected regions in the system memory 115, as described herein. In some embodiments, the GPU 110 includes a memory management unit (MMU) 154 which dynamically allocates memory for one or more protected regions in the local graphics memory 114 and manages requests to protected and unprotected regions in the local graphics memory 114, as described herein.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

In one exemplary embodiment, GPU 110 is operable for General-purpose computing on graphics processing units (GPGPU) computing. GPU 110 may execute Compute Unified Device Architecture (CUDA) programs and Open Computing Language (OpenCL) programs. GPU 110 may thus be used for a variety of computing applications including simulations of molecular dynamics, computational fluid dynamics, reservoir simulations, and finite structural problems. It is appreciated that the parallel architecture of GPU 110 may have significant performance advantages over CPU 101.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip" (SoC), where the electronics (e.g., the components 101, 115, 110, 114, and the like) of a computing device are wholly contained within a single integrated circuit die. Examples include a hand-held instrument with a display, a car navigation system, a portable entertainment system, and the like.

FIG. 2 shows exemplary components involved in decrypting data and storing the data in a protected manner, in accordance with various embodiments of the present invention. Exemplary components 200 include a content provider 202, a security processor 204, a memory management unit (MMU) 206, and a memory 210. The memory 210 is for storing data including digital content and program code executable by one or more processors. The memory can be system memory, graphics memory, frame buffer memory, etc.

The content provider 202 provides encrypted data. The encrypted data can be digital content including one or more video streams and one or more audio streams. For example, the content provider 202 may be a Btu-Ray Disc™ player or a streaming Internet server. The content provider 202 has access to the encrypted content and the content keys that can decrypt the content. The content provider 202 creates a secure channel between the content provider 202 and the security processor 204. For example, a Diffie-Hellman key exchange can be used to establish the secure channel. The content provider can further provide protection rules for accessing and processing the content once it is decrypted.

The security processor 204 is a processor providing a trusted environment for executing code. For example, the security processor 204 can only execute code that has been signed off on. The contents of the security processor 204 are not visible from the outside. For example, registers and other components of security processor 204 cannot be accessed by other processes. In some embodiments, the security processor is a multi-standard variable length decoder (MSVLD) security (SEC) processor. The security processor 204 can be part of a GPU, CPU, or combination thereof.

The creation of the secure channel between the content provider 202 and the security processor 204 allows a common session key to be established. The content provider 202 uses the session key to securely send the content key to the security processor 204. It is appreciated that the encrypted content 208 and the encrypted content key cannot be decrypted without the session key. In some embodiments, the content provider 202 copies the encrypted content to memory 210 (as encrypted content 208) via the MMU 206.

The security processor 204, upon receiving the session key and the content key encrypted with the session key, requests the encrypted content 208 via MMU 206. The security processor 204 decrypts the content key with the session key and uses the decrypted content key to decrypt the encrypted content 208. In some embodiments, the security processor 204 also fully or partially decompresses the content that is stored in the memory 210 as decrypted content 212. For example, the security processor 204 can, in one pass, decrypt and decompress the content without exposing or writing back any intermediate results of memory 210. The security processor 204 stores the decrypted content in the memory 210 as the decrypted content 212 via MMU 206. The MMU 206 stores the decrypted content 212 in a protected region of memory 210 at dynamically allocated addresses.

The MMU 206 manages memory 210 including processing read requests and write requests to memory 210. The MMU 206 further manages access security to protected and unprotected regions of the memory 210.

The MMU 206 virtualizes the storage of data in memory 210 thereby allowing the data to be stored in dynamically allocated regions located throughout the memory 210 while appearing to components making requests to the MMU 206 (e.g., a processor) as if the data is stored in a contiguous portion of memory 210. Due to the dynamic allocation of memory, the MMU 206 can map content with contiguous virtual addresses into non-contiguous portions of the memory 202. The MMU 206 provides virtual addresses for the locations of the encrypted content 208 and the decrypted content 212. For example, the decrypted content 212 may appear to the security processor 204 as located at virtual addresses from 0-1 million while the decrypted content 212 is at physical addresses scattered throughout the memory 210. As another example, the dynamically allocated locations in memory 206 can result in the decrypted content 212 being scattered throughout the memory 210 while appearing to other components (that access the memory 210 through the MMU) as being in single contiguous portions of memory 210. The MMU 206 translates the virtual addresses received for read and write requests into physical addresses of the memory 210. The MMU maintains data of the physical addresses for the protected and unprotected regions and determines whether to allow a memory access request to complete based on the protection of the physical address translated from the virtual address of a request.

MMU 206 thus dynamically allocates portions of memory for encrypted content 208 and decrypted content 212 throughout the memory 210 thereby removing the need to allocate large chunks of memory 210. The dynamic allocation by MMU 206 further allows the operating system to continue to manage the memory 210. When a location or address is deallocated from a protected region of the memory 210, the MMU 206 erases and/or writes over data at the address.

During the storing of decrypted content 212 to the memory 210, the MMU 206 can update a permissions or security data store that is used by the MMU 206 to control access to locations where the decrypted content 212 is stored in memory 210. For example, the MMU 206 can store read and write permissions on a component access basis in a table. The permissions information can further be stored with the virtualized memory address information. In some embodiments, the locations in the memory 210 are allocated on a per memory page basis and security is applied on a per memory page access basis. In some embodiments, secure software updates the security data store. The MMU 206 thus protects the decrypted content 212 from unauthorized access and copying.

In some embodiments, a data store includes protection information associated with locations in the read protected memory and the data store is maintained by secure software. In some embodiments, a data store includes protection information associated with locations in the read protected memory and the data store is automatically updated by hardware component upon a write to the read protected memory. In some embodiments, a data store includes protection information associated with locations in the protected memory, wherein the data store is created by unsecure software, and upon deallocation of a location with the protected memory, the data at location is overwritten.

Figure 3:
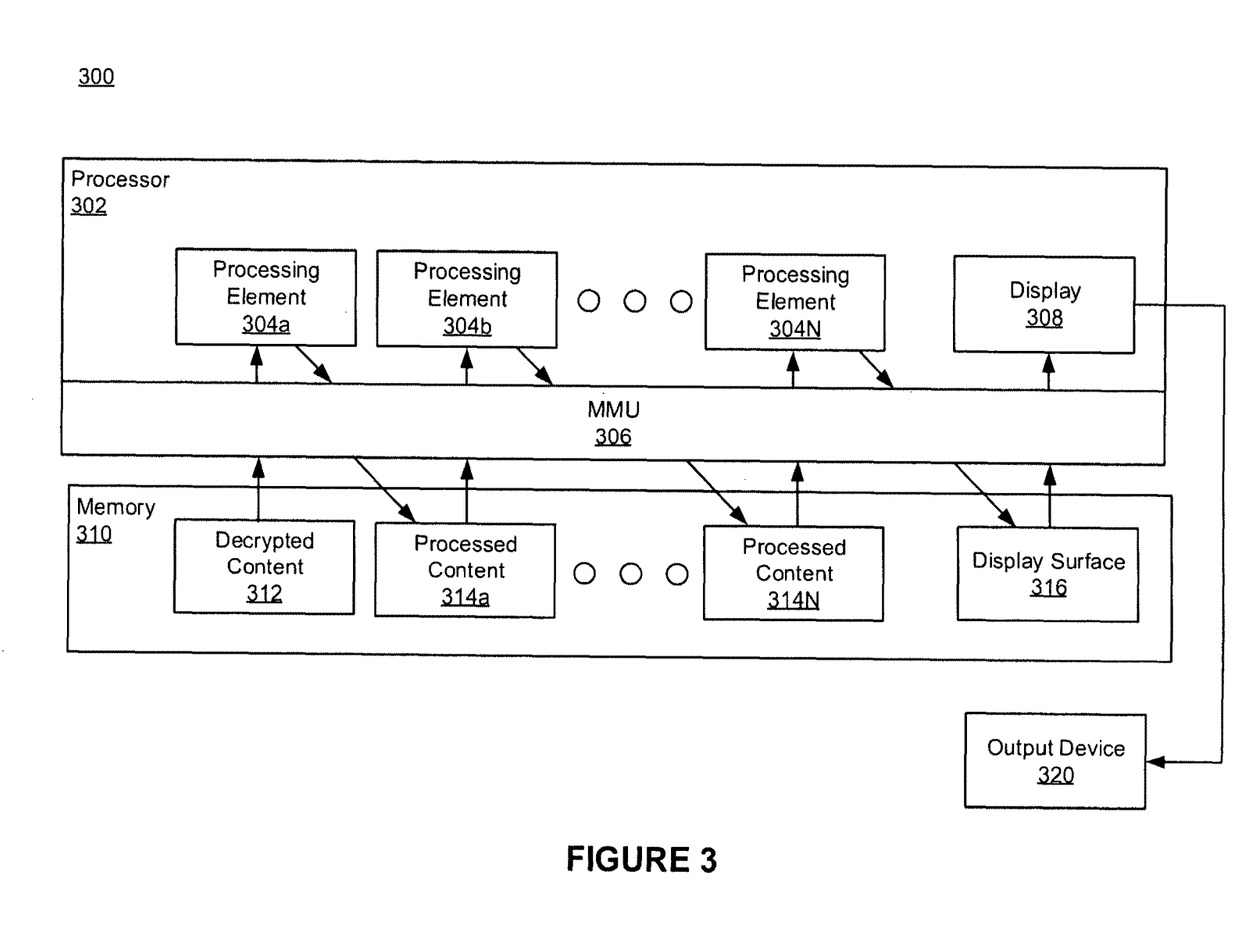
FIG. 3 shows exemplary components involved in accessing protected data and outputting the data in a protected manner, in accordance with various embodiments.

FIG. 3 shows exemplary components involved in accessing protected data and outputting the data in a protected manner, in accordance with various embodiments. FIG. 3 depicts processing of decrypted content 312 that is protected by MMU 306 by trusted processing elements 304a-N. The MMU 306 prevents unauthorized access to the decrypted content 312 and data based thereon by untrusted components and devices.

The processor 302 includes processing elements 304a-N, an MMU 306, and a display processing element 308. In some embodiments, the MMU 306 is located outside of the processor 302. The processing elements 304a-N may be any number of processing elements that perform tasks including decompression, graphics processing, post-processing, surface blending, decoding, encoding, etc. The processing elements 304a-N read and write data to and from the memory 310 via the MMU 306. The end result of the processes performed by the processing elements 304a-N is a display surface 316. The display surface 316 is output by the display processing element 308 to an output device 320. The output device 320 outputs the output from the display processing element 308 on a screen. For example, the output device 320 can be a monitor, a television, a projector, etc.

The processing elements 304a-N access protected data and write data back to one or more protected regions of the memory 310. The processing elements 304a-N process data without the content being accessible from outside components, thereby protecting the data in conjunction with MMU 306. For example, the processing element 304a accesses the decrypted content 312, processes it, and writes the output of the processing back to the memory 310 as processed content 314a in a region protected by the MMU 306. The processing element 304b then accesses the processed content 314a via the MMU 306, processes it, and writes the output of the processing back to the memory 310 as processed content 314b in a region protected by the MMU 306. The process may repeat for as many processing elements that are trusted and allowed to access the protected regions of the memory 310 as determined by the MMU 306 until the display surface 316 is written to a protected region of the memory 310 via MMU 306.

The display processing element 308 reads data of the display surface 316 in a protected region of the memory 310 via requests made to the MMU 306 and sends output to the output device 320. The display processing element 308 is configured to ensure that the data output is sent out in a secure manner. For example, the display processing element 308 refuses to output data to an output device 320 that is not high-bandwidth digital content protection (HDCP) compatible. As another example, the display processing element 308 can be configured to output only to particular versions of HDCP such as version 2.2 or greater. The display processing element 308 can thereby prevent unauthorized access by a frame grabber connected to the display processing element 308 instead of a monitor.

Protected data can also be output by a processing element with an approved encryption method. For example, the output of a transcoding process performed by one or more processing elements is encrypted with a particular encryption data format and an encryption key as specified by a content provider (e.g., the content provider 202).

The decrypted content 312, processed content portions 314a-N and display surface 316 are stored in the memory 310 in one or more regions that are protected by MMU 306. The processing elements 304a-N and the display processing element 308 are trusted engines that indicate which memory regions they want to access. The MMU 306 controls access to each of the protected data in decrypted content 312, processed content portions 314a-N, and display surface 316 to prevent unauthorized access thereof. The MMU 306 controls access to regions of the memory 310 that can be read protected, write protected, and read and write protected. For example, the memory 310 can include eight non-overlapping regions with region zero being unprotected and regions 1 through 7 being defined to be unprotected, read protected, write protected, or read and write protected. In some embodiments, a processing element indicates the region of memory associated with a memory access request by extending the memory address by three bits.

The MMU 306 ensures that access requests go to the appropriate regions in memory 310. For example, the MMU 306 can reject access requests from untrusted processing elements or other components located outside of processor 302 to read protected, write protected, or read-and-write protected memory locations.

For example, the memory 310 can be a frame buffer and the processor 302 can be a GPU. The MMU 306 can deny a request from a CPU to read the frame buffer over a PCIe channel. The MMU 306 can prevent access by an unauthorized program that programs an engine of the GPU to copy data from the frame buffer to system memory. The MMU 306 can further prevent an unauthorized program from probing internal memories of the one or more engines of the GPU. The MMU 306 of the processor 302 protects against such unauthorized accesses by only processing access requests from trusted components that are allowed to access the unencrypted video according to a region permissions data store.

With reference to FIGS. 4-7, flowcharts 400-700 illustrate example functions used by various embodiments for protecting data, as described herein. Although specific function blocks ("blocks") are disclosed in flowcharts 400-700, such steps are exemplary. That is, embodiments are well suited to performing various other blocks or variations of the blocks recited in flowcharts 400-700. It is appreciated that the blocks in flowcharts 400-700 can be performed in an order different than presented, and that not all of the blocks in flowcharts 400-700 need be performed.

Figure 4:
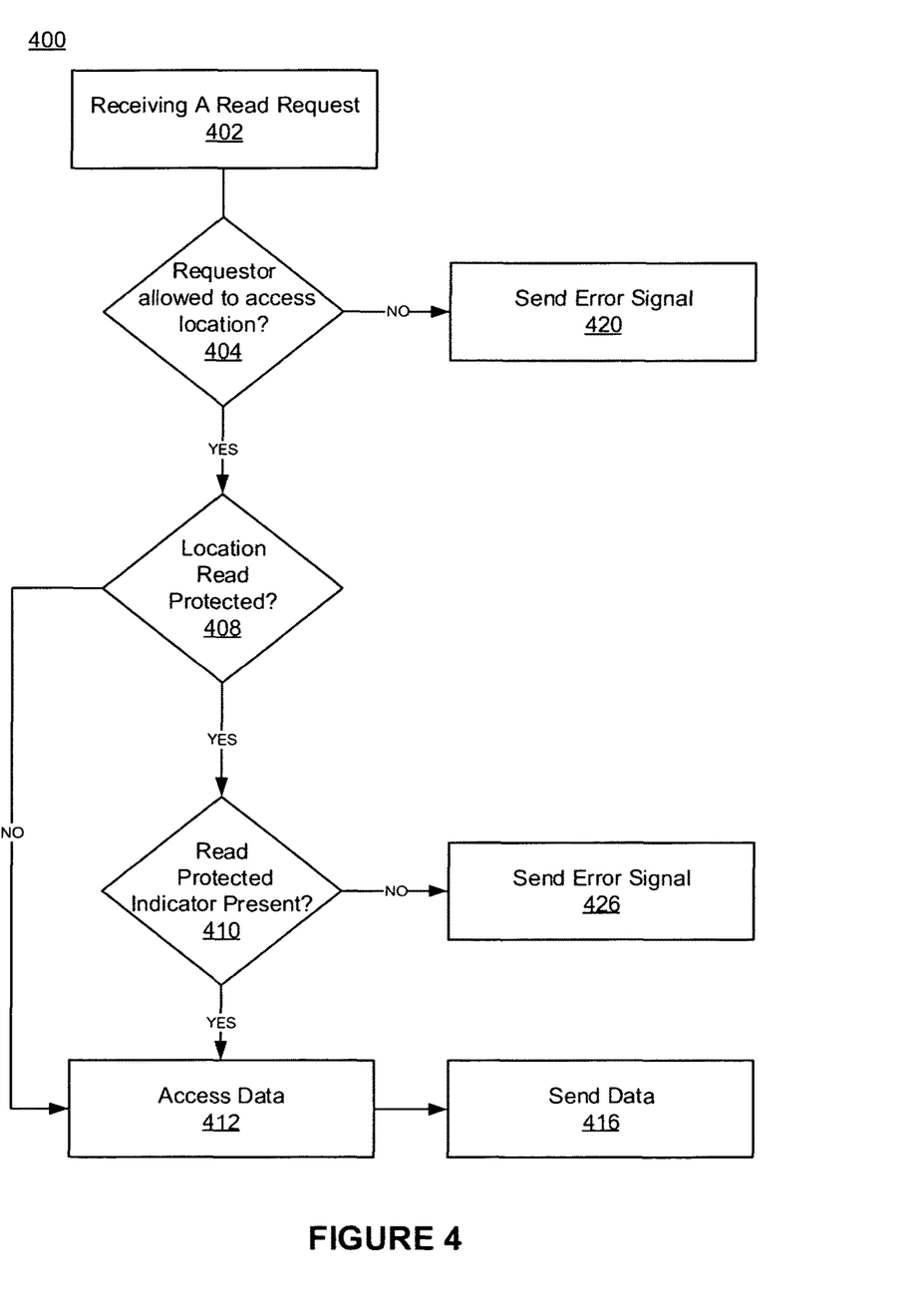
FIG. 4 shows an exemplary computer implemented process for processing a read request to a memory having a read protected region, in accordance with various embodiments.

FIG. 4 shows an exemplary computer implemented process for processing a read request to a memory having a read protected region, in accordance with various embodiments. FIG. 4 depicts a process 400 performed by a component processing a read request to read protected data in storage having one or more protected and/or unprotected regions. For example, the process 400 can be performed by the MMU 206 and/or the MMU 306.

At block 402, a read request is received. The read request is received at a MMU or another component handling the security of a protected region of memory. The read request can be received from a processing element of a processor. The read request can include a location, an identifier of the requesting component that sent the read request, and a read protected indicator. For example, the location can be a virtual address associated with a dynamically allocated physical address. The read protected indicator can indicate that the data in the response from the read request will be protected from unauthorized access by the component that sent the read request.

At block 404, whether the requesting component is allowed to access the location is determined. The MMU accesses a data store (e.g., a table) that includes memory locations and associated requesting components that are permitted to access the memory location of the read request. For example, the data store may have a read protected bit for each memory location in a protected memory region. The MMU determines that the processing elements and/or other external components that are not listed in the data store are not allowed to access the memory location. The MMU is thereby able to deny requests from untrusted components that send unauthorized requests indicating that they will protect the received data.

In some embodiments, there are multiple protected regions in the memory, with each region having particular processing elements that are permitted access to a particular region. For example, there can be a protected region for a video stream and a protected region for an audio stream. The video processing elements are allowed access to the video stream protected region and the audio processing elements are allowed access to the audio stream protected region. The MMU can thus only allow those processing elements that need to process the respective content access the respective protected regions. The content provider may specify which types of processing elements may access the content. For example, a 3D processing element may not be allowed access to video content that is 2D video content according to content provider rules.

Different levels of protections for various protected regions can be supported. In some embodiments, multiple video and multiple audio protected regions may be supported, with each region having different levels of protection or security. For example, one pair of video and audio protected regions can require HDCP 1.1 while another pair of video and audio protected regions require HDCP 2.2 as specified by a content provider.

If the requesting component is allowed to access the data at the location, block 408 is performed. If the requesting component is not allowed to access the data at the location, block 420 is performed.

At block 408, whether the location is protected is determined. The MMU accesses a data store having information of whether memory locations are part of a protected region and the type of protection. If the location is read protected, block 410 is performed. If the location is not read protected, block 412 is performed.

At block 410, whether a read protected indicator is present is determined. The read protected indicator indicates that the processing element will protect the data from the read request response and protect the output based on the read request response. The read protected indicator can be received from the processing element and indicates that the processing element is allowed to read protected memory. In some embodiments, the read protected indicator is a video protected region (VPR) bit indicating that the request is for protected video data. If the read protected indicator is present, block 412 is performed. If the read protected indicator is not present, block 426 is performed.

At block 412, the MMU accesses the data at the memory location specified in the read request. The MMU can send a read request to the memory after translating a virtual address from the read request into a physical address within the memory.

At block 416, the data is sent back to the requesting component that issued the read request. In some embodiments, the data is sent back to the processing element with an indication that the data is from protected memory and therefore should be protected from external and/or unauthorized access. Based on the indicator that the data is from protected memory, the processing element operates on the data with processes and restrictions to protect the data. For example, the processing element can ensure that data is not accessible by a debug process or a register read from another component. The processing element will further write back data, based on the read protected data, into protected memory.

If the processing element is configured for outputting the data, the processing element will only output the data to trusted devices. For example, the display processing element would refuse to send data to a monitor if the monitor was not HDCP protected. In some embodiments, the display processing element is deemed trusted by an MMU and therefore allowed to access a memory location after it has established an HDCP connection to the monitor.

At block 420, an error signal is sent. The MMU sends back an error message when the processing element is not allowed to access the requested memory location. The MMU thereby protects data from unauthorized access by processing elements and/or external or other components. In some embodiments, the error signal sent is a response with the data contents set to one or more zeroes.

At block 426, an error signal is sent. The MMU sends back an error message when the processing element has sent a read request with a read protection indicator that does not match the read protection on the memory location. The MMU thereby protects data from being read by authorized processing elements that are not intending to protect the data that is being requested.

Figure 5:
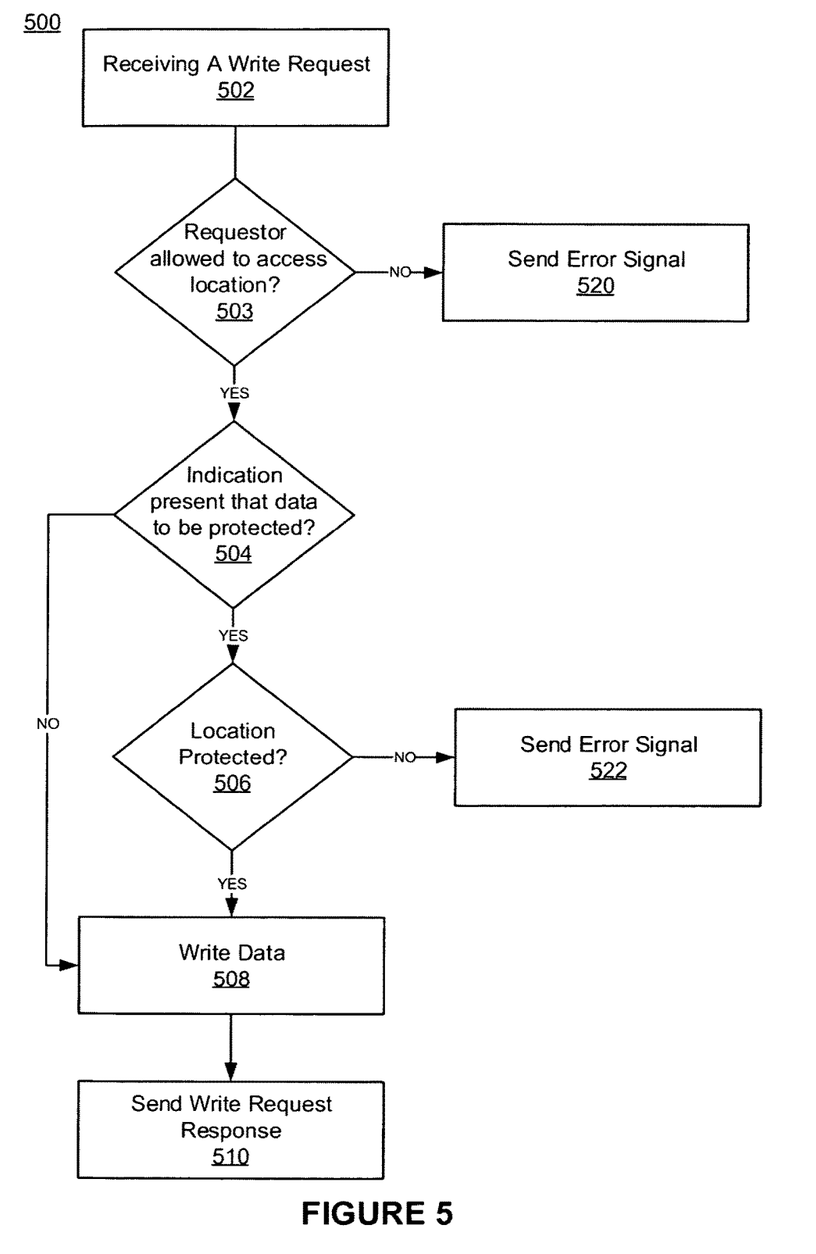
FIG. 5 shows an exemplary computer implemented process for processing a write request to a memory having one or more protected and/or unprotected regions, in accordance with various embodiments

FIG. 5 shows an exemplary computer implemented process for processing a write request to a memory having one or more protected and/or unprotected regions, in accordance with various embodiments. For example, the process 500 can be performed by the MMU 206 and/or the MMU 306.

At block 502, a write request is received. The write request is received at a MMU or another component handling the security of one or more protected regions of memory. The write request can be received from a processing element. The write request can include a location, data to be written to the location, an identifier of the requesting component that sent the write request, and an indication of whether the data is to be protected. For example, the location can be a virtual address that will be translated into a physical address by the MMU to determine whether to perform the write request. The write request can be from a security processor (e.g., security processor 302) that is storing unencrypted content to a protected region of memory.

A write request with an indication that the data is to be protected can be based on data that was previously accessed from a read protected region. For example, a decoding processing element may access unencrypted content stored in a read protected region, perform decoding on the unencrypted content, and request to write the decoded content to read protected memory.

At block 503, whether the requesting component is allowed to access the location is determined. The MMU accesses a data store (e.g., a table) that includes memory locations and associated requesting components that are permitted to access the memory location of the write request. For example, the data store may have a write protected bit for each memory location in a protected memory region. The MMU determines that the processing elements and/or other external components that are not listed in the data store are not allowed to access the memory location. The MMU is thereby able to deny write requests from untrusted components that send unauthorized requests indicating that the data is to be protected. If the requesting component is allowed to access the data at the location, block 504 is performed. If the requesting component is not allowed to access the data at the location, block 520 is performed.

At block 504, whether there is an indication that the data of the write request is to be protected is determined. If the MMU determines that the write request indicates that the data is to be protected, block 506 is performed. If the MMU determines that the write request indicates that the data is not to be protected, block 508 is performed.

At block 506, whether the location is protected is determined. The MMU accesses a data store having information of whether memory locations are part of a protected region and the type of protection. If the location is protected, or if the location can be promoted to read protected, block 508 is performed. If the location is not protected, and cannot be promoted to read protected, block 522 is performed.

At block 508, the data of the write request is written. The data of the write request is written to the location of the write request. In some embodiments, if the data being written is protected data, the MMU updates the data store to indicate that the location where the data will be written will now contains protected data At block 510, a response to the write request is sent. The MMU can send a response indicating that the write request to read protected memory has been performed or that the write request to non-protected memory has been performed.

In some embodiments, prior to writing the data to a protected region, whether the permissions for the location can be changed is determined. The MMU can access a data store having information of whether the permissions of a memory location are allowed to be changed. For example, the permissions of a memory location may be allowed to be changed to read protected or write protected for requests from certain processing elements. If the permissions can be changed, the permissions of the location are updated. The MMU can update the location permissions in the data store having information of whether memory locations are part of a protected region and the type of protection. For example, the physical memory location associated with the write request may have the permissions updated to indicate that the location is read protected. If the permissions are not allowed to be changed, block 522 can be performed.

At block 522, an error signal is sent. The MMU sends back an error message when the processing element has sent a write request to a location with protection that does not match the protection indicator. The error signal can include an interrupt to a processor, a signal to the processing element, or an error flag set in a register. In some embodiments, the write request is dropped due to the mismatch of the location protection and the write request protection indicated.

Figure 6:
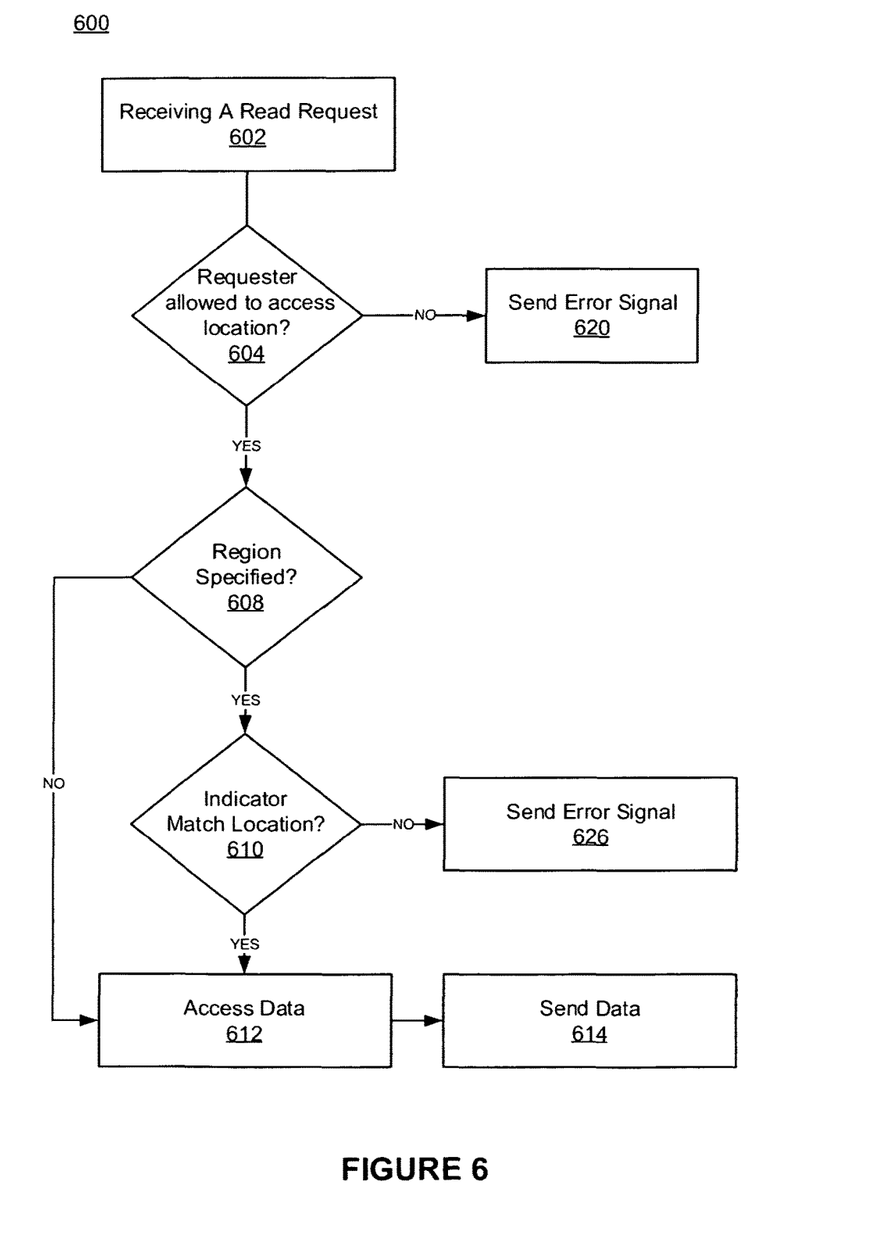
FIG. 6 shows an exemplary computer implemented process for processing a read request to a memory having a protected region, in accordance with various embodiments.
Figure 7:
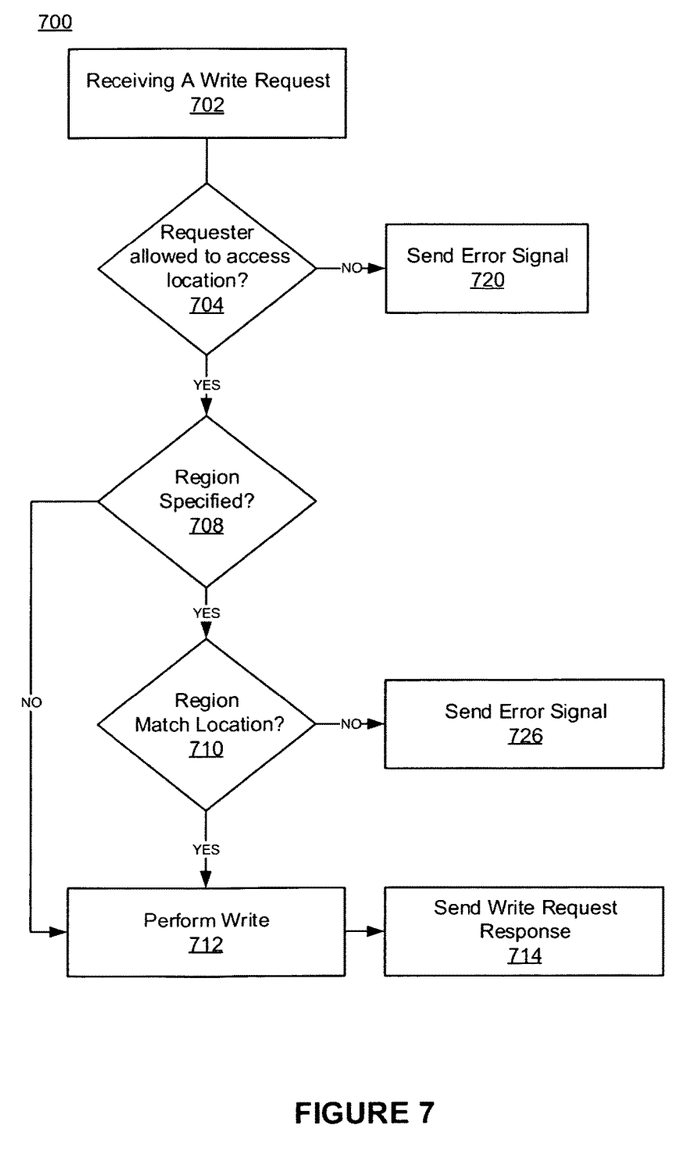
FIG. 7 shows an exemplary computer implemented process for processing a write request to a memory having a protected region, in accordance with various embodiments.

FIGS. 6 and 7 show an exemplary computer implemented processes for processing read and write requests to memory having a protected region, in accordance with various embodiments. The protected region of memory can have executable code that is to be write protected to ensure trusted code is protected from unauthorized modification and/or tampering. Additionally, the MMU can ensure that a processor is executing the code from the protected region by enforcing that only instruction fetch operations (read requests) are completed from the protected region. The protected region may contain security policies and/or rules (e.g., from a service provider) and write protection provided by the region prevents tampering with the security policies and/or rules.

FIG. 6 depicts a process performed by an MMU processing a read request to storage with one or more protected and/or unprotected regions. For example, the process 600 can be performed by the MMU 206 and/or the MMU 306.

At block 602, a read request is received. The read request is received at a MMU or another component handling the security of protected regions of memory. The read request can be received from a processing element or another component. The read request can include a location, an identifier of the requesting component that sent the read request, and an indicator of a region associated with the memory location. For example, the location can be a virtual address that will be translated into a physical address by the MMU to determine whether to perform the read request. The indication can indicate that the memory location is in a protected region of memory. In some embodiments, the indication includes a region identifier when the memory has multiple regions (e.g., unprotected, protected data for processor A, protected data for processor B, and so forth)

At block 604, whether the requesting component is allowed to access the location is determined. The MMU accesses a data store (e.g., a table) that includes memory locations and associated requesting component that are permitted to access the memory location of the read request. For example, the data store may have a write protected bit for each memory location in a protected memory region. The MMU determines that the processing elements and/or other external components that are not listed in the data store are not allowed to access the memory location.

If the requesting component is allowed to access the location, block 608 is performed. If the requesting component is not allowed to access the location, block 620 is performed.

At block 608, whether an indication of the region was specified is determined. If the indication of a region is specified, block 610 is performed. If there is no region specified, block 612 is performed.

At block 610, whether the indicator matches the location is determined. The MMU accesses the indicator and determines whether the protection region specified by the indicator matches the protection region associated with the memory location. For example, whether the region number of the indicator matches the region number (e.g., accessed from the protection information data store) associated with the memory location is determined. If the MMU determines that regions match, block 612 is performed. If the MMU determines that the regions do not match, block 626 is performed.

At block 612, the MMU accesses the data at the memory location specified in the read request. The MMU can send a read request the memory after translating a virtual address in the location portion of the read request into a physical address within the memory.

At block 614, the data is sent back to the requesting component that issued the read request. In some embodiments, the data is sent back to the processing element with an indication that the data is from write protected memory and therefore can be trusted.

At block 620, an error signal is sent. The MMU sends back an error message when the requesting component is not allowed to access the requested memory location and when a protection indicator is not present yet the location is protected. The MMU thereby protects data from unauthorized access. In some embodiments, the error signal sent is a response with the data contents set to one or more zeroes.

At block 626, an error signal is sent. The MMU can send back an error message when the processing element has sent a read request with a protection indicator that does not match the protection on the memory location.

FIG. 7 depicts a process performed by an MMU processing a write request to storage with one or more protected and/or unprotected regions. For example, the process 700 can be performed by the MMU 206 and/or the MMU 306.

At block 702, a write request is received. The write request is received at a MMU or another component handling the security of protected regions of memory. The write request can be received from a processing element or another component. The write request can include a location, data to be written, an identifier of the requesting element that sent the write request, and an indication of whether the data is to be written to a protected region of memory. For example, the location can be a virtual address that will be translated into a physical address by the MMU to determine whether to perform the read request. In some embodiments, the indication can further include a region identifier when the memory has multiple regions (e.g., unprotected, protected data for processor A, protected data for processor B, and so forth).

At block 704, whether the requesting component is allowed to access the location is determined. The MMU accesses a data store (e.g., a table) that includes memory locations and associated requesting components that are permitted to access the memory location of the write request. For example, the data store may have a write protected bit for each memory location in a protected memory region. The MMU determines that the processing elements and/or other external components that are not listed in the data store are not allowed to access the memory location.

If the requesting component is allowed to access the location, block 708 is performed. If the requesting component is not allowed to access the location, block 720 is performed.

At block 708, whether an indication of a region was specified is determined. If indication indicates that the data is to be written to a protected region of memory, block 710 is performed. If the indication does not indicate that the data is to be written to a protected region of memory, block 712 is performed.

At block 710 whether the indicator matches the location is determined. The MMU accesses the indicator and determines whether the indicator indicates that the data is to be written to a protected region of memory. In some embodiments, the MMU determines if the protection of the memory region matching region identifier is protected. If the MMU determines that the indicator indicates that the data is to be written to a protected region and the memory location is write protected, block 712 is performed. If the MMU determines that the indicator indicates that data is not to be written to a protected region and the memory location is write protected, block 726 is performed.

At block 712, the write request is performed. The data of the write request is written to the location of the write request. For example, the data is written to the physical address associated with the virtual address of the memory location of the write request as determined by the MMU.

At block 714, a response to the write request is sent. The MMU can send a response indicating that the write request has been written to protected memory or that the write request has been written to non-protected memory.

At block 720, an error signal is sent. The MMU sends back an error message when the requesting component is not allowed to access the requested memory location. The MMU thereby protects data from unauthorized access by processing elements and/or external or other components.

At block 726, an error signal is sent. The MMU can send back an error message when the processing element has sent a write request with a write protection indicator that does not match the protection on the memory location.

Referring now to FIG. 8, a block diagram of a computer system platform and associated modules in accordance with various embodiments is shown. With reference to FIG. 8, example system modules for implementing embodiments disclosed above, such as those described in FIGS. 1-7. The system includes a general purpose computing system environment, such as computing system environment 800. The computing system environment 800 may include servers, desktop computers, laptops, tablets, mobile devices, and smartphones, etc. The computing system environment 800 typically includes at least one processing unit 802 and computer readable storage medium 804. Depending on the exact configuration and type of computing system environment, computer readable storage medium 804 is volatile (such as RAM), non-volatile (such as ROM, flash memory, etc.) or some combination of the two. Portions of computer readable storage medium 804 when executed may perform method of protecting one or more regions of memory, as described herein.

Additionally in various embodiments, the computing system environment 800 may also have other features/functionalities. For example, the computing system environment 800 may also include additional storage (removable and/or non-removable) including, but not limited to, magnetic or optical disks or tape. Such additional storage is illustrated by removable storage 808 and non-removable storage 810. Computer storage media includes volatile and nonvolatile, removable and non-removable media implemented in any method or technology for storage of information such as computer readable instructions, data structures, program modules or other data. Computer readable medium 804, removable storage 808 and nonremovable storage 810 are all examples of computer storage media. Computer storage media includes, but is not limited to, RAM, ROM, EEPROM, flash memory or other memory technology, expandable memory (e.g. USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by the computing system environment 800. Any such computer storage media is part of the computing system environment 800.

The computing system environment 800 may also contain communications connection(s) 812 that allow it to communicate with other devices. Communications connection(s) 812 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Communications connection(s) 812 may allow the computing system environment 800 to communicate over various networks types including, but not limited to, fibre channel, small computer system interface (SCSI), Bluetooth, Ethernet, Wi-Fi, Infrared Data Association (IrDA), Local area networks (LAN), Wireless Local area networks (WLAN), wide area networks (WAN) such as the internet, serial, and universal serial bus (USB). It is appreciated the various network types that the communication connection(s) 812 connect to may run a plurality of network protocols including transmission control protocol (TCP), user datagram protocol (UDP), Internet Protocol (IP), real-time transport protocol (RTP), real-time transport control protocol (RTCP), file transfer protocol (FTP), and hypertext transfer protocol (HTTP), etc.

In further embodiments, the computing system environment 800 may also have input device(s) 814 such as a keyboard, mouse, a terminal or terminal emulator (either directly connected or remotely accessible via telnet, SSH, HTTP, SSL, etc.), a pen, voice input device, touch input device, a remote control, etc. Output device(s) 2016 such as a display, speakers, LEDs, etc., may also be included.

The computer readable storage medium 804 includes a memory allocation module 822, an address translation module 824, a data store 826, a read request receiving module 828, a read request processing module 830, a read request performance module 832, a write request receiving module 834, a write request processing module 836, a write request performance module 838, and an access request response module 840.

The memory allocation module 822 dynamically allocates memory for protected and unprotected regions in a memory, as described herein. The memory allocation module 822 can determine virtual addresses and physical addresses for the dynamically allocated memory of the protected and unprotected regions. The address translation module 824 translates virtual addresses from read and write requests to physical addresses in memory, as described herein. The data store 826 stores data associated with the virtual addresses and physical addresses, the type of protection, and which of the one or more processing elements and other system components are allowed to access a particular location of memory, as described herein.

The read request receiving module 828 receives read requests which can include a location, an identifier of the requesting component sending the read request, and an indication as to whether the location is read protected, as described herein. The read request processing module 830 determines whether a read request should be performed or if an error signal should be generated, as described herein. The read request performance module 832 performs read requests that the read request processing module 830 has determined are allowed to be performed, as described herein.

The write request receiving module 834 receives write requests which can include a location, data to be written to the location, an indication as to whether the data should be protected (e.g., read or write protected), and an identifier of the requesting component sending the write request, as described herein. The write request processing module 836 determines whether a write request should be performed if an error signal should be generated, as described herein. The write request performance module 838 performs write requests that the write request processing module 836 has determined are allowed to be performed, as described herein. The access request response module 840 sends back responses to read and write requests as determined the read request processing module 830 and the write request processing module 836 and/or as performed by the read request performance module 832 and the write request performance module 838, as described herein.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of processing a read request, the method comprising:
   receiving a read request corresponding to a requesting component, wherein the read request comprises a virtual address associated with a memory, and an indicator indicating that data associated with the virtual address will be protected from unauthorized access;
   determining a physical address associated with the virtual address;
   determining whether the physical address associated with the virtual address is read protected;
   determining whether the component is allowed to access read protected memory, wherein the read protected memory was dynamically allocated on a per page basis; and
   in response to determining that the read request is to a read protected physical address and determining that the component is allowed to access read protected memory, sending the data from the physical address in the memory.

2. The method of claim 1, wherein the protected memory comprises a plurality of dynamically allocated noncontiguous memory locations.

3. The method of claim 1, wherein data stored at the physical address comprises protected digital content.

4. The method of claim 1, wherein the indicator is read protected.

5. The method of claim 1, wherein a data store comprises protection information associated with locations in the protected memory and the data store is maintained by secure software.

6. The method of claim 1, wherein a data store comprises protection information associated with locations in the protected memory and the data store is automatically updated by a hardware component upon a write to the read protected memory.

7. The method of claim 1, wherein a data store comprises protection information associated with locations in the protected memory, wherein the data store is created by unsecure software, and upon deallocation of a location with the protected memory, the data at the location is overwritten.

8. A method of processing a write request comprising:
   receiving the write request, wherein the write request comprises a virtual address associated with a memory, data, an identifier of a component requesting the write request, and an indicator that the data is to be written to a protected region within the memory;
   determining a physical address associated with the virtual address;
   determining whether the physical address associated with the virtual address is in protected memory, wherein the protected memory was dynamically allocated on a per page basis;
   determining whether the write request is from a component allowed to access protected memory; and
   in response to determining that the write request is to a protected physical address and determining that the component is allowed to access protected memory, writing the data to the physical address in the memory, wherein a data store is created by unsecured software and comprises protection information associated with locations in the protected memory, further wherein the data at a location within the protected memory is overwritten in response to a deallocation of the location.

9. The method of claim 8, wherein the write request is received at a memory management unit (MMU).

10. The method of claim 8 further comprising:
    in response to determining that the indicator indicates that data is to be written to a protected region in the memory and that the physical address associated with virtual address in the memory is not protected, sending an error signal.

11. The method of claim 8, wherein data stored at the physical address in the memory comprises write protected executable code.

12. The method of claim 8, wherein the data store is maintained by secure software.

13. The method of claim 8, wherein the data store is automatically updated by a hardware component in response to data being written to the read protected memory.

14. A device comprising:
a memory;
a data store comprising information associated with memory locations in a protected region of the memory and information associated with access to the protected region of memory by one or more components;
a processor comprising one or more processing elements; and
a memory management unit (MMU) for processing read and write requests to the memory from the processor, the MMU being configured to limit read access of the one or more processing elements to a protected portion of the memory,
wherein the protected region comprises dynamically allocated portions of the memory on a per page basis,
further wherein read requests processed by the MMU comprise an indicator indicating that data associated with the protected region of the memory will be protected from unauthorized access.

15. The device of claim 14, wherein the MMU is further configured to limit write access to the one or more processing elements to a protected portion of the protected region of the memory.

16. The device of claim 15, wherein the write protected portion comprises executable code associated with a processing element of the one or more processing elements.

17. The device of claim 14, wherein the data store is maintained by secure software.

18. The device of claim 14, the data store is automatically updated by the MMU in response to data being written to the read protected memory.

19. The device of claim 14, wherein the data store is created by un-secured software, further wherein the data at a location within the protected memory is overwritten by the MMU in response to a deallocation of the location.

* * * * *